United States Patent [19]
Grosseau

[11] 3,761,110
[45] Sept. 25, 1973

[54] MULTI-ACCUMULATOR HYDRAULIC SUSPENSION SYSTEM

[75] Inventor: Albert Grosseau, Paris, France

[73] Assignee: Societe Anonyme Automobiles Citroen, Paris, France

[22] Filed: Sept. 6, 1972

[21] Appl. No.: 286,669

[52] U.S. Cl............................... 280/124 F, 267/64
[51] Int. Cl........................................... B60g 11/30
[58] Field of Search.................... 280/124 F; 267/64

[56] References Cited
UNITED STATES PATENTS
3,083,983    4/1963    Wettstein...................... 280/124 F
3,689,103    9/1972    Meulendyk..................... 280/124 F Primary Examiner—Philip Goodman
Attorney—E. F. Wenderoth et al.

[57] ABSTRACT

This hydro-pneumatic suspension device for motor vehicles comprising at least two accumulators set at different pressures and at least one slide valve distributor adapted to connect said accumulators having different pressures, separately and by turn, to cylinders associated with the wheels of the vehicle, said slide valve distributor being urged to a first positon by a gaged resilient member and pushed to another position by the fluid pressure in the load circuit when this pressure exceeds a predetermined threshold value, said device comprising in the circuit connecting said cylinder to said slide valve distributor a switching delay valve comprising means for holding its slide member in two predetermined positions, whereby the passage from one position to the other position of said slide member takes place according to the direction of movement at different values of the suspension pressure.

2 Claims, 2 Drawing Figures

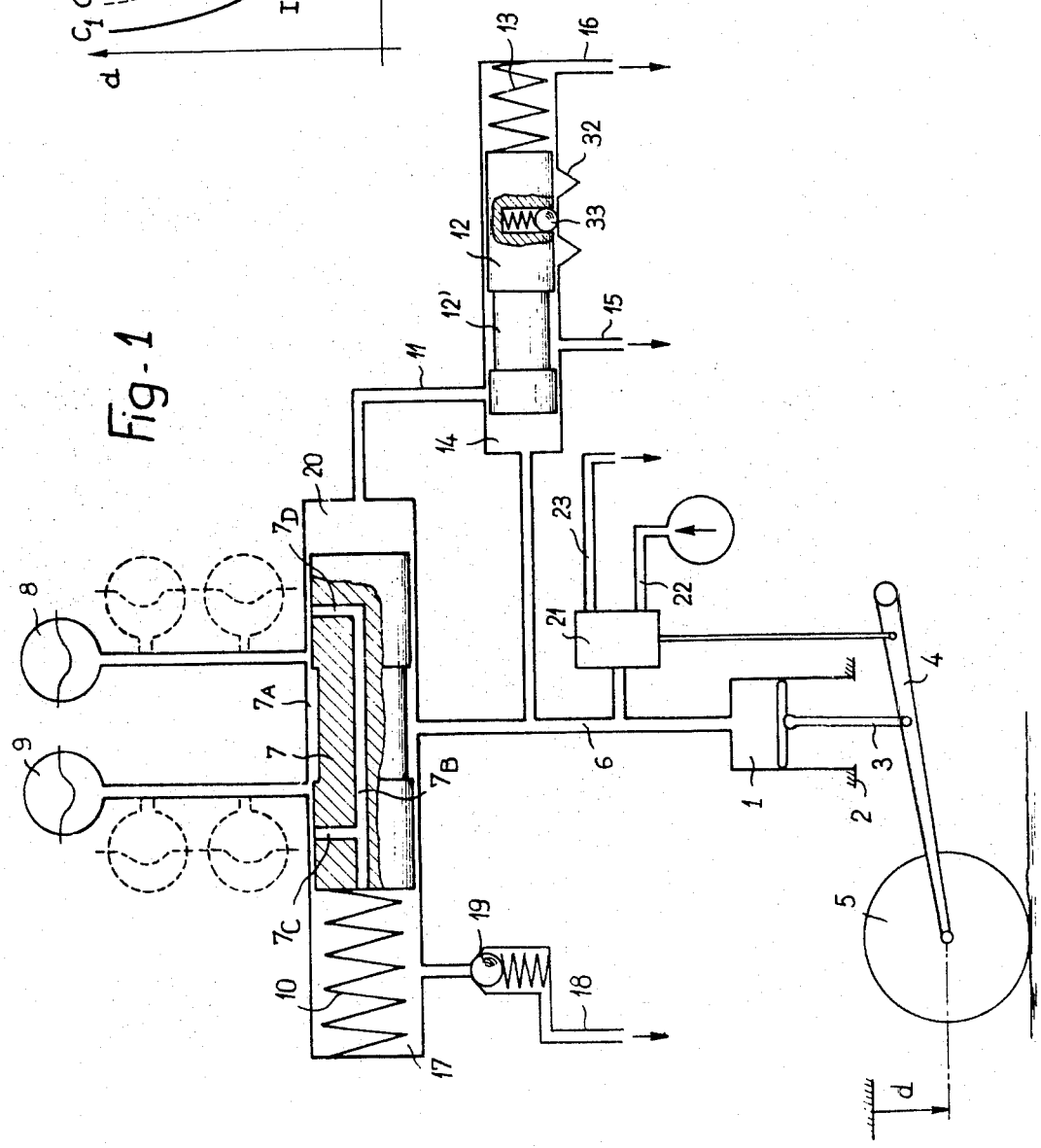

3,761,110

MULTI-ACCUMULATOR HYDRAULIC SUSPENSION SYSTEM

In a prior U.S. Pat. No. 3.522.941, the Applicant described and illustrated a hydraulic suspension system for motor vehicles which comprised a plurality of hydro-pneumatic accumulators operating at different pressure ranges and permitting of replacing a single accumulator operating under a relatively low pressure with an accumulator operating at a higher pressure, and vice versa, in order automatically to adapt the suspension flexibility to the momentary load of the vehicle.

However, in this system the switching from operation with one accumulator to operation with another accumulator, and the transitory conditions resulting from this switching, take place whenever the suspension pressure reaches a predetermined threshold, as a consequence of suspension beats, as frequently observed notably when driving on certain types of road surfaces. Now each flexibility change resulting therefrom may prove unpleasant to the passengers, and may even be a cause of serious discomfort.

It is the primary object of the present invention to reduce the frequency of said switchings by delaying the control thereof, i.e., cutting off the communication with one accumulator during a suspension fluid pressure increment only at a value of this pressure definitely higher than that required for the same accumulator for becoming again operative in the hydraulic circuit during a pressure reduction. Thus, any switchings during normal suspension beats occurring when driving the vehicle are eliminated, the switching occurring only in case of considerably changes in the static load.

To this end, in a hydro-pneumatic suspension system for motor vehicle which comprises at least two accumulators having different gas loads so as to operate under different pressures, each accumulator communicating by turns with a suspension cylinder through a slide valve distributor responsive to the suspension pressure and urged to a first position by a gauged resilient member, said slide valve distributor being moved to a second position when the fluid pressure in said cylinder becomes higher than a predetermined threshold value, there is provided, between the suspension cylinder circuit section and the chamber controlling said slide valve distributor, a switching delay slide valve comprising means for holding same in predetermined positions, whereby the change from one position to another of said last-named delay slide valve take place, according to the direction of movement, at different values of the suspension pressure.

In order to have a clearer understanding of this invention, reference will now be made to the accompanying drawing illustrating diagrammatically by way of example a typical form of embodiment thereof. In the drawing:

FIG. 1 is a general view of a hydro-pneumatic suspension system according to this invention, and FIG. 2 is a diagram showing the suspension flexibility curves plotting the variations in wheel beat as a function of the pression $p$ of the hydraulic fluid in the corresponding suspension cylinder.

Referring to FIG. 1, the suspension system comprises a cylinder 1 fastened to the chassis or body 2 of the motor vehicle and having slidably mounted therein, in fluid-tight relationship, a piston connected through its rod 3 to an unsprung portion of the vehicle, such as the support arm 4 of a wheel 5. This cylinder 1 is filled with liquid fluid under pressure and communicates alternatively, via a circuit section 6 in which the distribution chamber 7A of a control slide member 7 is interposed, with the hydro-pneumatic accumulators 8 and 9. As in conventional systems the slide member 7 is responsive on one side to a return spring 10 constantly urging same to a position in which the cylinder 1 communicates with accumulator 8, and on the opposite side to the liquid pressure in chamber 20 connected to said cylinder 1 via a branch line 11 through a slide valve member 12. This valve member is responsive on one side to the force of a return spring 13 and on the other side to the pressure prevailing in circuit section 6 and therefore in the valve chamber 14. The slide valve member 12 has formed therein a groove 12' so that according to the position of slide valve member 12 the branch line 11 can communicate either with the circuit section 6 or with the exhaust via line 15. On the other hand, the chamber containing the return spring 13 communicates permanently with the exhaust via a pipe line 16 for the simple purpose of recovering the liquid likely to leak about the slide valve member 12. This slide valve device further comprises in its bore two spaced positioning notches 31, 32 adapted to be engaged by a ball 33 loaded by a spring and housed in a cavity formed in said valve 12.

On the other hand, the distributor slide member 7 comprises passages $7_B$, $7_C$, $7_D$ for alternatively communicating the accumulators 8 and 9 with chamber 17 enclosing the spring 10 and connected in turn to the exhaust via a pipe line 18 containing a spring-loaded ball valve 19 in order to maintain a predetermined pressure in chamber 17 and therefore in the accumulator connected thereto.

In FIG. 1, each slide member 7, 12 is shown in an intermediate position corresponding to one fraction of the permissible movement between two stable end position.

Finally, in a manner known per se, a ground-clearance or trim corrector 21 connected to one point of the wheel supporting arm 4 is supplied with fluid under pressure via a pipe line 22 and connected to the exhaust via another line 23. The corrector of which the function differs from, and is independent of, the device of this invention is not described in detail herein. It is only necessary to point out that by acting on said arm 4 it causes the ground clearance or height of the vehicle body to vary as desired.

The device of this invention operates as follows:

Under moderate load conditions, the pressure $p$ in cylinder 1 is low and prevails also in chamber 14, slide member 12 urged by spring 13 (with ball 33 in notch 31) permits the escape of fluid from chamber 20 to return line 15, slide member 7 urged by spring 10 causes the accumulator 8 (loaded with gas under a relatively low pressure) to communicate via chamber $7_A$ with the suspension cylinder 1 (high-flexibility operation corresponding to curve $C_1$ of the diagram of FIG. 2, area I), the accumulator 9 is connected to the return line 18 via passages $7_C$ and $7_B$, and also through the ball valve 19 maintaining the pressure in accumulator 9 at a value $P_3$ selected to be preferably close to the "switching" pressures corresponding to the changes of position of slide members 12 and 7.

Under high load conditions the pressure $p$ is sufficient in chamber 14 to cause slide member 12 compressing spring 13 (with ball 33 in notch 32) to permit the flow of compressed fluid from chamber 14 to chamber 20; consequently:

slide member 7, compressing spring 10, causes the accumulator 9 (loaded with gas under a relatively high pressure) to communicate via chamber $7_A$ with the suspension cylinder 1 (low-flexibility operation corresponding to curve $C_2$ of the diagram, area III), accumulator 8 is connected to the return line 18 via passages $7_D$ and $7_B$, and also through ball valve 19 maintaining the pressure value in accumulator 8 at a value $P_3$.

The switching caused by a load increment, and therefore the sliding movement of member 7 in the direction causing the cylinder 1 to communicate with accumulator 9, take place when the pressure $p$ reaches the value $P_2$ sufficient to cause the other slide member 12 to remove the ball 33 from its notch 31 (area $II_A$ of the diagram).

The switching due to a load reduction and causing therefore the slide member 7 to slide in the direction to cause the cylinder 1 to communicate with the other accumulator 8, take place when the pressure $p$ reaches a value $p_1$ low enough to cause the spring 13 to remove the ball 33 from its notch 32 (area $II_B$ of the diagram).

Under medium load conditions, i.e., between values $p_1$ and $p_2$ of the suspension fluid pressure, the slide member 12 remains in the previously attained position (areas I' or III' of the diagram), without changing the flexibility as would occur if the valve 12 were not provided.

Of course, various changes may be brought to the specific form of embodiment shown and described herein, without inasmuch departing from the basic principle of the invention, as will readily occur to those conversant with the art. Thus, a plurality of accumulators 8 or 9 may be provided in parallel relationship as shown in phantom lines in the drawing.

What is claimed as new is:

1. Hydro-pneumatic suspension device for motor vehicle comprising at least two accumulators having different gas loads for operating under different pressures and at least one slide-valve distributor for causing two accumulators having different gas loads to communicate separately and alternatively with a cylinder associated with one or a plurality of wheels of the motor vehicle, said slide valve distributor having its slide member constantly urged towards a first position by means of a gauged resilient member and adapted to be moved to another position by the fluid pressure prevailing in a branch circuit of the load circuit when said fluid pressure becomes higher than a predetermined threshold, said device being characterised in that a delay switching valve is inserted in said branch circuit between said cylinder and said slide-valve distributor, said switching valve comprising means for holding its movable member in two predetermined positions whereby the changes from one position to the other of said sliding valve member take place according to the direction of movement at different values of the suspension pressure.

2. Device according to claim 1, characterised in that said valve comprises a sliding member and that said means for holding said sliding member in position comprise positioning notches co-acting with a spring-loaded ball.

* * * * *

UNITED STATES PATENT OFFICE
CERTIFICATE OF CORRECTION

Patent No. 3,761,110    Dated September 25, 1973

Inventor(s)  ALBERT GROSSEAU

It is certified that error appears in the above-identified patent and that said Letters Patent are hereby corrected as shown below:

— —  Foreign Application Priority Data

France          No. 7132139         September 6, 1971

Signed and sealed this 15th day of January 1974.

(SEAL)
Attest:

EDWARD M. FLETCHER, JR.              RENE D. TEGTMEYER
Attesting Officer                    Acting Commissioner of Patents